Sept. 28, 1954  F. W. FENTON  2,689,965
EXTENSIBLE ADJUSTABLE DOCK BOARD
Filed June 16, 1950  4 Sheets-Sheet 1
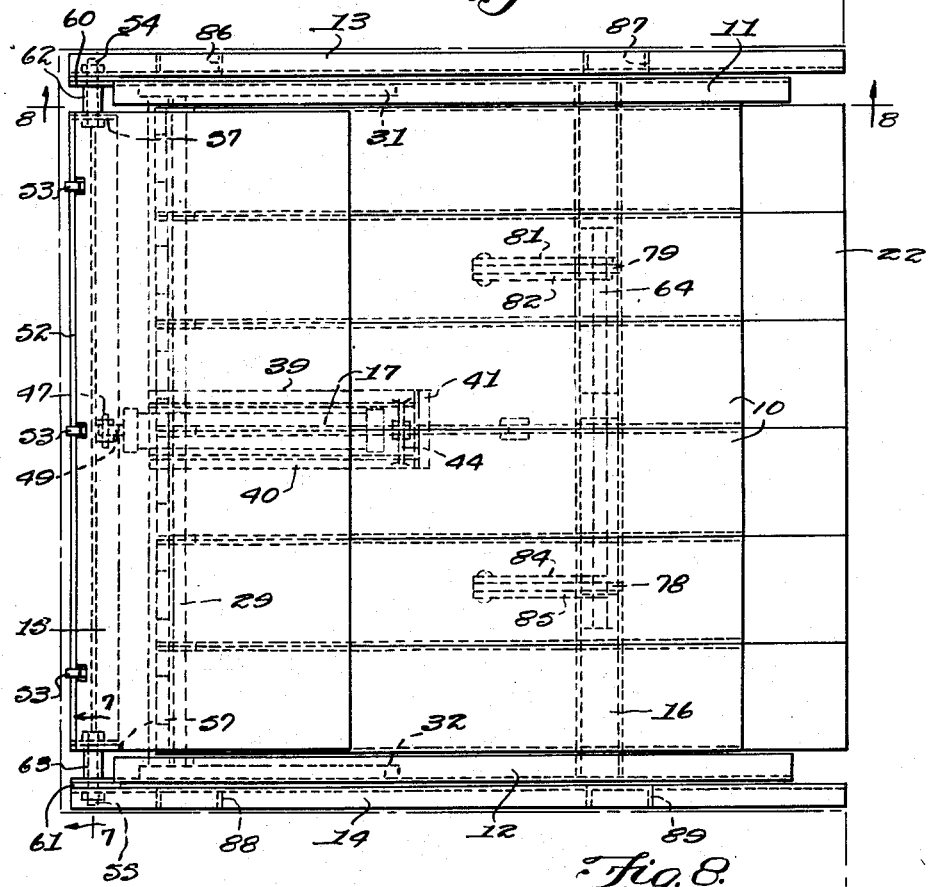
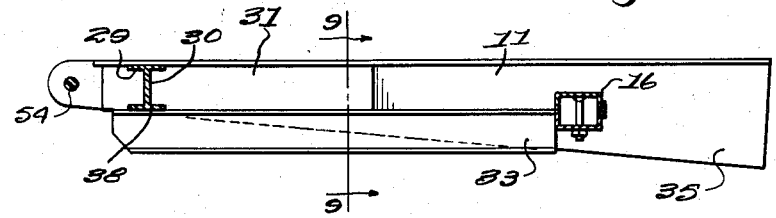
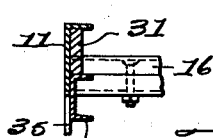
INVENTOR.
Frank W. Fenton,
BY Victor J. Evans & Co.
ATTORNEYS

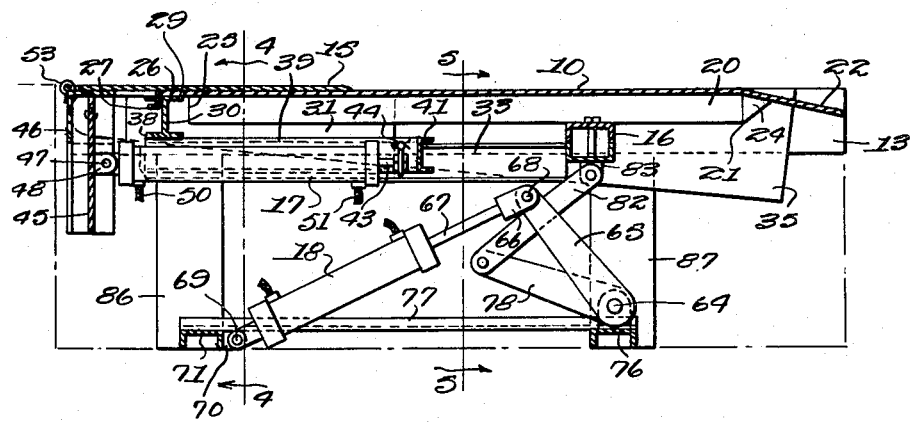

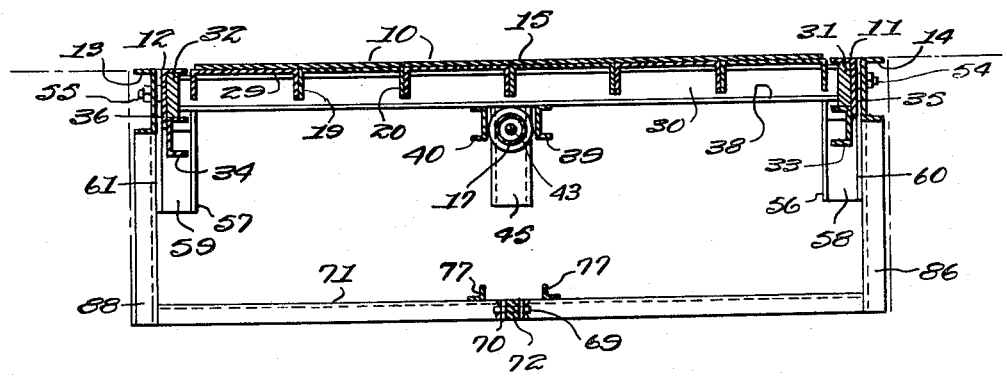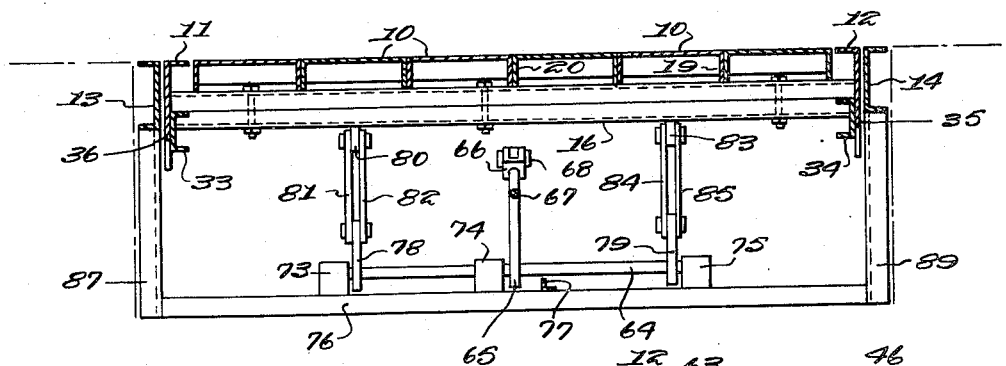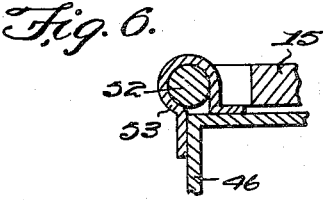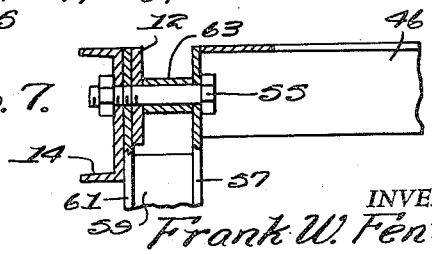

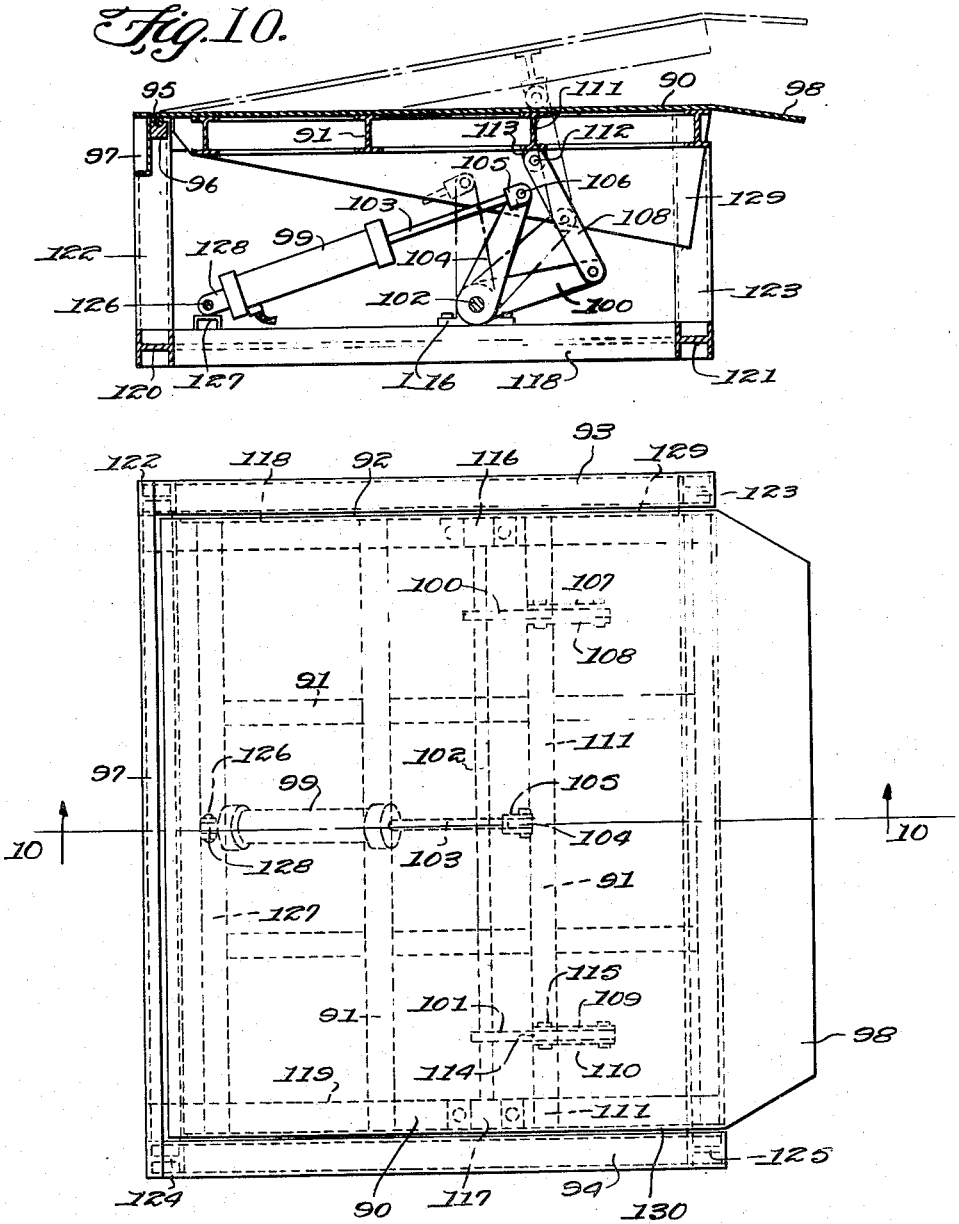

Patented Sept. 28, 1954

2,689,965

UNITED STATES PATENT OFFICE 2,689,965

EXTENSIBLE ADJUSTABLE DOCK BOARD

Frank W. Fenton, St. Louis, Mo., assignor, by direct and mesne assignments, to Beacon Production Equipment Corporation, Centreville Township, Ill., a corporation of Illinois Application June 16, 1950, Serial No. 168,405

17 Claims. (Cl. 14—71)

1

This invention relates to loading and unloading devices used in combination with trucks and docks particularly in warehouses and shipping platforms, and in particular an insert in the edge of a dock with the inner ends hinged to the dock and with means for adjusting the elevation of the outer end and also for extending the outer end to meet the elevation and position of the end of the floor of a truck.

The purpose of this invention is to provide means for accurately adjusting the outer end of a section of a dock or platform to compensate for the elevation and position of the floor of a truck to facilitate loading and unloading of the truck.

Various attempts have been made to level up the floor or surface of a loading platform to compensate for truck floors of different elevations but because the floor of the truck is not always exactly level and because it is difficult to stop the truck with the end of the floor meeting the edge of the platform it is difficult to roll hand trucks to and from the truck without the loss of considerable time in adjusting the blocks and other leveling devices. With this thought in mind this invention contemplates a hinge section in a platform with the outer end supported by a transverse beam actuated by levers controlled by pneumatic or hydraulic cylinders and in which the section is formed of a plurality of individual elements and also in which the elements are telescopically mounted.

The object of this invention is, therefore, to provide means for constructing and mounting a dock board in a loading platform or the like whereby the outer edge of the dock board is both vertically and horizontally adjustable.

Another object of the invention is to provide an improved dock board for loading platforms in which the loading surface is formed of a plurality of elements, each of which seeks its own level when positioned upon the end of the floor of a truck thereby compensating for trucks having uneven floors.

Another object of the invention is to provide an improved dock board for loading platforms that may readily be installed in docks and platforms now in use.

A further object of the invention is to provide an improved dock board for loading platforms in which the outer edge is horizontally and vertically adjustable to compensate for truck floors of different elevations and in different positions which is of a comparatively simple and economical construction.

2

With these and other objects and advantages in view the invention embodies a dock board formed of a plurality of longitudinally disposed channels slidably mounted in a frame the inner end of which is hinged to a platform with a cover plate bridging the inner ends of the channels and with pneumatic cylinders for extending and adjusting the elevation of the outer ends of the channels.

Other features and advantages of the invention will appear from the following description taken in connection with the drawings wherein:

Figure 1 is a plan view of the dock board illustrating the board positioned in a gap in a platform, the platform being indicated in dot and dash lines.

Figure 2 is a longitudinal section through the platform and dock board showing the dock board in the retracted position.

Figure 2a is a detail illustrating the mounting of the inner ends of the channels.

Figure 2b is a similar detail taken on line 2b—2b of Figure 2a.

Figure 3 is a similar section showing the dock board elevated and extended.

Figure 4 is a cross section through the dock board taken on line 4—4 of Figure 2.

Figure 5 is a similar section taken on line 5—5 of Figure 2.

Figure 6 is a detail showing a section through the hinge whereby the cover plate is hinged to a stationary beam in the platform.

Figure 7 is a detail taken on line 7—7 of Figure 1 showing a section through the hinge.

Figure 8 is a longitudinal section similar to that shown in Figure 2 taken on line 8—8 of Figure 1 illustrating the sliding bars at the sides of the dock board.

Figure 9 is a detail showing a section taken on line 9—9 of Figure 8 showing the sliding bar at the side of the dock board positioned on a channel of the mounting frame.

Figure 10 is a longitudinal section similar to that shown in Figure 2 showing a modification wherein the dock board is formed of a continuous plate with the inner end hingedly mounted in the platform and with the extensible means omitted, said section being taken on line 10—10 of Figure 11.

Figure 11 is a plan view of the dock board mounting illustrated in Figure 10.

Referring now to the drawings wherein like reference characters denote corresponding parts the improved dock board of this invention includes a plurality of juxtapositioned inverted channels 10, side beams 11 and 12 in which the channels are adapted for slidable movement, as will be shown hereinbelow, supporting beams 13 and 14 through which the inner ends of the beams 11 and 12 are hinged, a cover plate 15, a transverse beam 16, and pneumatic cylinders 17 and 18 by which the positions of the elements of the dock board are adjusted. Beam 16 is secured at its ends to side beams 11, 12, adjacent the normally outer ends thereof thereby providing a generally U-shaped frame.

Each of the channels 10 is provided with flanges 19 and 20 and the outer ends of the flanges terminate at the points 21 with the web extended providing an inclined tongue 22 that is positioned to rest upon the floor of a truck as indicated by the dot and dash lines 23 in Figure 3. The ends of the flanges are shaped to provide gusset plates 24 for reinforcing the tongues 22. The inner ends of the flanges 19 and 20 terminate at the points 25 with the webs extended providing tongues 26, the ends of which extend downwardly and inwardly providing L-shaped sections 27 that extend through slots 28 in the flange 29 of a supporting H-beam 30, as illustrated in Figure 2a, thereby providing a hinge joint between the channels and H-beam.

The H-beam 30 is supported between sliding bars 31 and 32 and the bars 31 and 32 are positioned to slide on the upper flanges of channels 33 and 34, respectively. The channels 33 and 34 are secured to the inner surfaces of the side beams 11 and 12. The side beams 11 and 12 are provided with downwardly extended flanges 35 and 36 that overlap the gap between the upper surface of the board or webs of the channels 10 and the floor of the dock or platform, as illustrated in Figure 3 when the dock board is elevated.

The lower flange 38 of the H-beam 30 is secured to channels 39 and 40 of a U-shaped frame having a channel 41 at the outer end and the pneumatic cylinder 17 is positioned in the frame with the outer end 42 of a connecting rod 43 connected to the frame by a cross bar 44, and with the inner end of the cylinder pivotally mounted on a web 45 of a mounting beam 46, positioned in the platform, by a bolt 47 which is extended through lugs 48 and 49, pressure applied to the cylinder forces the dock board outwardly as illustrated in Figure 3 to compensate for the position of the end of a truck floor. The cylinder 17 is provided with suitable air hose connections 50 and 51 through which pressure may be applied to either end of the cylinder.

The support beam 46 is mounted in the platform and a cover plate 15 is hinged to the upper edge thereof by pins 52 of the cover plate. The pins 52 are journaled in bearing straps 53 on the edge of the beam 46 and with the plate 15 mounted in this manner the outer edge moves upwardly with the channels 10 whereby the plate bridges the gap between the inner ends of the channels and dock or platform surface.

The inner ends of the side beams 11 and 12 are pivotally mounted in the inner ends of the support beams 13 and 14 by bolts 54 and 55 which connect the ends of the support beam 46 to the supporting channels 13 and 14, as shown in Figure 7. The ends of the support beam 46 are connected to inner channels 56 and 57 of channels 58 and 59 and flanges 60 and 61 on the outer edges of the channels are positioned between the side beams 11 and 12 and the support beams 13 and 14. Spacing sleeves 62 and 63, positioned on the bolts may be secured to the inner faces of the webs of the beams 11 and 12.

The outer ends of the channels 10 rest freely upon the transverse beam 16 which is supported, as illustrated in Figures 2 and 3, by levers mounted on a shaft 64. The shaft 64 is provided with an arm 65 that is connected to a socket 66 on the outer end of a connecting rod 67 of the cylinder 18 by a bolt 68 and the cylinder 18 is pivotally mounted by a bolt 69 between lugs 70 on a channel 71 with the bolt extended through a tongue 72 on the end of a cylinder.

The shaft 64 is journaled in bearings 73, 74 and 75 on a channel 76 which is held in spaced relation to the channel 71 by an angle 77.

The shaft 64 is provided with upwardly extended arms 78 and 79, the arm 78 being connected to a bearing 80 on the under surface of the beam 16 by links 81 and 82 and the arm 79 being connected to a bearing 83 also extended from the under surface of the beam 16 by links 84 and 85.

With the parts arranged in this manner an operator in a control room may apply fluid under pressure to the inner end of the cylinder 18, as illustrated in Figure 1 and the connecting rod will be forced outwardly elevating the beam 16 through the levers on the shaft 64 and thereby elevating the outer end of the channel 10. At the same time pressure may be applied to the cylinder 17 for forcing the channels outwardly, as illustrated in Figure 3 and when the tongues 22 on the outer ends of the channels are positioned above the floor 23 of a truck body pressure is relieved in the cylinder 18 whereby the channels drop downwardly with the tongues 22 resting upon the floor surface. By this means wherein the channels are independently mounted the channels assume position to compensate for uneven floor surfaces.

The support beams 13 and 14 may be mounted in the dock or platform in a suitable manner and as illustrated in the drawings the beam 13 is supported by channels 86 and 87 and the beam 14 by similar channels 88 and 89.

In the design illustrated in Figures 10 and 11 a continuous floor board 90 reinforced by I beams 91 is positioned in an opening 92 with frames 93 and 94 at the sides and the inner edge of the board 90 is positioned upon a rod 95 on a block 96 carried by the inner face of a supporting channel 97 that connects the inner ends of the members 93 and 94.

In this design the floor board 90 is provided with an extended tongue 98 that is positioned to rest upon the floor of a truck, similar to the tongues 22 of the channels 10 shown in Figures 1, 2 and 3.

In this design the floor board is elevated by a cylinder 99 through levers 100 and 101 on a shaft 102, the shaft being actuated by a connecting rod 103 which is connected to the outer end of an arm 104 carried by the shaft, by a socket 105 and a bolt 106. The levers 100 and 101 are pivotally connected to the under surface of the floor board 90, the lever 100 being connected by links 107 and 108 and the lever 101 being connected by links 109 and 110.

The upper ends of the links 107 and 108 are pivotally connected to one of the I beams, indicated by the numeral 111 by a bolt 112 in the bearing 113 and the links 109 and 110 are pivotally connected to a similar bearing 114 by a bolt 115.

The shaft 102 is journaled in bearings 116 and 117 on beams 118 and 119 of a base structure, the beams being framed between end beams 120 and 121 and the upper beam 93 being supported by posts 122 and 123 with the beam 94 carried by posts 124 and 125.

The cylinder 99 is pivotally mounted by a bolt 126 on the bearing member 127 through a tongue 128.

With the parts arranged in this manner fluid under pressure applied to the cylinder 99 forces the connecting rod 103 outwardly and thereby elevating the dock board 90 through the levers and connecting links. In this design the floor board is provided with downwardly extended flanges 129 and 130 at the sides to enclose the openings at the sides of the board with the board in the elevated position and these flanges and also the corresponding flanges 35 and 36 prevent the toe of an operator or other object or device being caught under the edges of the floor board.

It will be understood that other modifications may be made in the design and arrangement of the parts without departing from the spirit of the invention.

What is claimed is:

1. An adjustable dock board comprising a frame having a pair of side members and a transverse beam secured at its ends to said side members adjacent the outer ends thereof, a cross member extending between, and supported by, said side members and spaced from said transverse beam, roll-over surface-forming means pivoted on said cross member and freely supported on said transverse beam, means for pivotally mounting said frame adjacent the ends of said side members remote from said transverse beam, and elevating means engaged to the outer portion of said frame to raise said surface-forming means for disposition upon an adjacent surface on which said surface-forming means will be supported upon subsequent lowering of said transverse beam.

2. An adjustable dock board comprising a frame having a pair of side members and a transverse beam secured at its ends to said side members adjacent one of the ends thereof, a cross member extending between, and supported by, said side members and spaced inwardly from said transverse beam, a plurality of longitudinal sections providing a roll-over surface, each of said sections being pivoted on the cross member and freely supported on the transverse beam, means for pivotally mounting said frame adjacent the ends of said side members remote from said transverse beam, and elevating means engaged to the outer portion of said frame to simultaneously swing same and raise the longitudinal sections for disposition upon an adjacent surface on which said sections will readily adjust to the contour thereof upon subsequent lowering of said transverse beam.

3. An adjustable dock board as described in claim 2 wherein the longitudinal sections are juxtapositioned and extend beyond the transverse beam.

4. An adjustable dock board as described in claim 2 wherein the longitudinal sections are juxtapositioned and extend beyond the transverse beam, and the elevating means engaged to the outer portion of the frame is fluid actuated.

5. An adjustable dock board comprising a frame having a pair of spaced parallel side members and a transverse beam rigidly secured at its ends to said side members adjacent the outer ends thereof, a cross member extending between, and supported by, said side members parallel to, and spaced inwardly of, said transverse beam, a plurality of independent juxtapositioned, longitudinal sections providing a roll-over surface, each of said sections being hingedly mounted on their inner ends upon the cross member and freely supported upon the transverse beam with the outer ends of said sections projecting therebeyond, means for pivotally mounting said frame adjacent the inner ends of said side members whereby said frame is swingable in a vertical plane, and fluid actuated elevating means engaged to the outer portion of said frame to simultaneously swing same and raise the sections for disposition upon an adjacent surface on which said sections will readily adjust to the contour thereof upon subsequent lowering of said transverse beam.

6. An adjustable dock board as described in claim 1 wherein the cross member is slidably mounted for movement longitudinally of said side members, and means for effecting said movement of said cross member whereby said roll-over surface means may be moved relatively to said transverse beam for accommodation purposes.

7. An adjustable dock board for disposition adjacent to, or within a pit provided in, a loading platform, comprising a frame having spaced side members and an outer beam extending transversely therebetween and rigidly secured at its ends to said side members, each side member having a trackway provided thereon, an inner beam extending between said side members and being slidably mounted on said trackways, means for moving said inner beam, roll-over surface forming means swingably engaged to said inner beam and freely supported upon said outer beam whereby upon movement of said inner beam said roll-over surface-forming means will be moved relatively to said outer beam for accommodation purposes, and means for raising and lowering said frame.

8. An adjustable dock board for disposition adjacent to, or within a pit provided in, a loading platform, comprising a frame having spaced side members and an outer beam extending transversely therebetween and rigidly secured at its ends to said side members, each of said side members having an inwardly presented, longitudinal trackway provided thereon, an inner beam extending between said side members and being slidably mounted on said trackways from and away from said outer beam, means for moving said inner beam, a plurality of longitudinal independent sections providing a roll-over surface, each of said sections being hingedly engaged at their inner ends to the inner beam and freely supported upon said outer beam, whereby upon movement of said inner beam said sections will be moved relatively to said outer beam for accommodation purposes, and means for raising and lowering said frame.

9. An adjustable dock board for disposition adjacent to, or within a pit provided in, a loading platform, comprising a frame having spaced side members and an outer beam extending transversely therebetween and rigidly secured at its ends to said side members, each of said side members having an inwardly presented longitudinal trackway provided thereon, an inner beam extending between said side members, a slide bar secured to said inner beam at each end thereof and slidably mounted on said trackways, means for moving said slide bars along said trackways, roll-over surface-forming means swingably engaged to said inner beam and freely supported upon said outer beam whereby upon movement of said inner beam and slide bars, said roll-over surface-forming means will be moved relatively to said outer beam for accommodation purposes, and means for raising and lowering said frame.

10. An adjustable dock board for disposition adjacent to, or within a pit provided in, a loading platform, comprising a support frame having lateral members, a U-shaped frame having side members and an outer beam extending transversely between, and rigidly secured at its ends to, said side members, said U-shaped frame being pivotally mounted on the lateral members of said support frame adjacent the inner ends of said side members, said side members each having inwardly directed flanges in their upper portions, a longitudinal member rigidly secured to the inner face of each side member and having a flange spaced downwardly from the flange of the associated side member to define a trackway therebetween, an inner beam extending between said side members in spaced parallel relation to said outer beam, a slide bar disposed in each trackway and engaged to said inner beam at opposite ends thereof, fluid operated means engaged to said inner beam for effecting movement of said inner beam and slide bars along said trackways, a plurality of juxtapositioned longitudinal sections providing a roll-over surface, each of said sections being engaged at their inner ends to said inner beam and being freely supported upon said outer beam, whereby upon actuation of the fluid operated means, said sections may be moved relatively to said outer beam for accommodation purposes.

11. An adjustable dock board for disposition adjacent to, or within a pit provided in, a loading platform, comprising a support frame having lateral members, a U-shaped frame having side members and an outer beam extending transversely between, and rigidly secured at its ends to, said side members, said U-shaped frame being pivotally mounted on the lateral members of said support frame adjacent the inner ends of said side members, said side members each having a longitudinal trackway provided thereon, an inner beam extending between said side members in spaced parallel relation to said outer beam, a slide bar disposed in each trackway and engaged to said inner beam at opposite ends thereof, fluid operated means engaged to said inner beam for effecting movement of said inner beam and slide bars along said trackways, a plurality of juxtapositioned longitudinal sections providing a roll-over surface, each of said sections being engaged at their inner ends to said inner beam and being freely supported upon said outer beam, whereby upon actuation of the fluid operated means, said sections may be moved relatively to said outer beam for accommodation purposes.

12. An adjustable dock board for disposition adjacent to, or within a pit provided in, a loading platform comprising, a frame having spaced side members, an outer beam extending transversely between, and rigidly secured at its ends to said side members, an inner transverse beam extending between said side members, roll-over surface-forming means pivotally engaged at one end to said inner beam and freely supported upon said outer beam, means for pivotally mounting said frame adjacent the inner ends of said side members for vertical swingable movement of said frame, said side members being each provided with a longitudinal trackway, said inner beam being mounted for slidable movement along said trackways, first driving means operably engaged to said outer beam for elevating same to simultaneously swing said frame and liftingly raise said roll-over surface-forming means for disposition upon an adjacent surface, whereby upon subsequent lowering of said outer beam the surface-forming means will be supported upon said adjacent surface, and second driving means for moving said inner beam along said trackways whereby said surface-forming means may be moved relatively to said frame extensibly or retractably for accommodation purposes.

13. An adjustable dock board as described in claim 12 wherein a plurality of longitudinal sections provide a roll-over surface, said sections being pivotally engaged at their inner ends to said inner beam and freely supported upon said outer beam and projecting therebeyond.

14. An adjustable dock board as described in claim 12 wherein a slide bar is engaged to said inner beam at each end thereof, said slide bars being slidably mounted in said trackways, and said first and second driving means are fluid actuated.

15. An adjustable dock board for disposition adjacent to, or within a pit provided in, a loading platform, comprising a support frame having lateral members, a U-shaped frame having side members and an outer beam extending transversely between, and rigidly secured at its ends to, said side members, said U-shaped frame being pivotally mounted on the lateral members of said support frame adjacent the inner ends of said side members, said side members each having a longitudinal trackway provided thereon, an inner beam extending between said side members in spaced parallel relation to said outer beam and being slidably mounted on said trackways toward and away from said outer beam, a plurality of juxtapositioned independent longitudinal sections providing a roll-over surface, each of said sections being hingedly engaged at their inner ends to said inner beam and being freely supported upon said outer beam and projecting therebeyond, a cover plate hinged to the frame adjacent its inner end for extension over the inner ends of the sections to bridge the space between the ends of said sections and the inner end of said frame, a first fluid cylinder mounted in the lower portion of the support frame, link means connecting said first cylinder to the outer beam whereby upon application of fluid under pressure to said first cylinder, actuation of the link means will be effected for raising said outer beam to liftingly elevate the outer ends of the longitudinal sections for disposition upon an adjacent surface, and a second fluid cylinder having a connecting rod and being pivotally mounted in the inner end portion of the support frame, means for connecting the connecting rod of said second fluid cylinder to said inner beam whereby upon application of fluid under pressure to said second fluid cylinder, the inner beam will be moved along said trackways with said longitudinal sections being moved relatively to said outer beam for accommodation purposes.

16. An adjustable dock board as described in claim 15 wherein the side members of the U-shaped frame have depending flanges providing toe-plates, and a slide bar is secured to said inner beam at each end thereof, said slide bars being supported upon said trackways, and the outer ends of said longitudinal sections are downwardly inclined in the provision of tongues.

17. A platform device comprising a floor adjustable upwardly and downwardly to different inclinations both above and below the horizontal and also adjustable endwise to a retracted or extended position at any one of said inclinations, a floor supporting frame pivoted at one end to swing about a substantially horizontal fixed axis, an individual power unit connected to said supporting frame and operable at will to set it at any desired floor inclination, a carriage slidably mounted in the pivoted supporting frame and connected to the floor for adjusting the floor in its own plane towards and from the fixed axis of the supporting frame, and a second power unit connected to said carriage and operable at will to set it in any desired floor retracted or floor extended position, wherein the platform is made up of a series of separate slats extending longitudinally thereof, said slats being pivoted individually at their inner ends to the adjusting carriage for independent upward movement with reference thereto, all of said slats having a substantially horizontal pivotal axis extending parallel to the fixed axis of the pivoted supporting frame.

References Cited in the file of this patent

UNITED STATES PATENTS

| Number | Name | Date |
|---|---|---|
| 1,106,074 | Bidlake | Aug. 4, 1914 |
| 1,112,543 | Love | Oct. 6, 1914 |
| 1,698,209 | Barlow | Jan. 8, 1929 |
| 1,967,620 | Kahn | July 24, 1934 |
| 2,449,829 | Agren | Sept. 21, 1948 |
| 2,527,653 | Pierce | Oct. 31, 1950 |
| 2,547,460 | Hamilton, Jr. | Apr. 3, 1951 |
| 2,560,064 | Astry | July 10, 1951 |

OTHER REFERENCES

Architectural Record, October 1948, page 179.